June 8, 1948.  C. E. GALLEY  2,442,847
APPARATUS FOR MOLDING DENTURES
Filed Aug. 24, 1945  2 Sheets-Sheet 2

INVENTOR.
Charles E. Galley
BY

Patented June 8, 1948

2,442,847

UNITED STATES PATENT OFFICE 2,442,847

APPARATUS FOR MOLDING DENTURES

Charles E. Galley, Chicago, Ill., assignor to Luxene Inc., a corporation of Delaware Continuation of application Serial No. 481,249, March 31, 1943. This application August 24, 1945, Serial No. 612,391

2 Claims. (Cl. 18—5.7)

This invention relates to apparatus for molding dentures. Materials found most acceptable at the present time for the purpose of molding dentures are the vinyl types of resins that polymerize to hard solids under the action of heat in a mold, and it is with apparatus for molding materials of this nature that the invention is more particularly concerned.

The denture art is peculiar in that for each denture an individual mold is required. It is made by first casting an impression of the gums in "stone" (gypsum) to form a model upon which a wax pattern of the denture is then built with the teeth properly inserted for occlusion. The model carrying the wax pattern is invested in plaster in the lower half of a split flask, the upper ring of the flask is placed on the lower half and filled with plaster, and then the lid is applied; after the plaster has set, the closed flask is immersed in boiling water to thoroughly soften the wax, whereupon the flask is opened and the wax removed to leave a mold cavity in the plaster in the upper part of the flask. This is the practice universally followed for making the mold.

For molding a denture the "press-pack" procedure is commonly followed. This consists in packing the cavity with the denture material by a "trial-and-error" method, closing the flask and subjecting the flask to heat to set the resin. If the mold is overpacked, the excess is squeezed out, as the flask closes, onto the land area at the parting which prevents proper closing and forms a fin to cause a "raised-bite" error in the molded denture; to correct the error the teeth must subsequently be ground to bring them again into proper occlusion. If the mold is underpacked, the mold does not fill properly and sufficient pressure cannot be maintained to prevent volatilization taking place and formation of bubbles in the denture. In addition the denture material, whether overpacked or underpacked, shrinks largely during the early polymerization or curing stage for which no compensation can be made; the denture then becomes less in volume than the original wax pattern, and it is not an accurate reproduction of the model and the wax pattern.

To overcome the problems of improper packing and shrinkage, it has been proposed to inject the denture material from a cylindrical chamber by the action of a spring-pressed plunger through a sprue opening and so into the mold cavity of the heated closed flask; this, however, imports other factors, in that the flask must be maintained both water-tight and pressure-tight around the entire periphery of the parting to prevent outward leakage of material, entrance of water or opening at the parting with loss of pressure and bubble-formation. The usual method of clamping the flask parts together by spaced bolts has the objection that the clamping pressure is applied at spots and then not to an equal degree. Under the "press-pack" method of molding this may suffice, since no external pressure is applied on the material after flask closure to spread the flask halves apart. But for injection-molding by means of excess material under external pressure, the use of spaced clamping bolts have been found inadequate; the unclamped portions of the flask parting, even with a tight closing of the bolts, show a tendency toward separation with leakage of material into the parting and bubble-formation under the pressure exerted on the material. Necessary to the ends of the invention is therefore a maintenance of non-separation at the parting for injection-molding.

It has been found that the locking and maintenance of a water- and pressure-tight closure at the parting against any pressure (within practical limits) that may be exerted or transmitted by the material within the mold cavity can be achieved by a flask construction and a cooperating clamping structure. The flask is one having its top and bottom surfaces in planes parallel to that of the contacting surfaces of the flask halves; the cooperating clamp comprises a flat bed plate, upon which the flask rests, and an enveloping inverted cup-shaped cage having a flat surface contacting the top of the flask in parallel to the bed plate and having a screw threaded engagement with the edge of the bed plate. This arrangement gives an accurate constantly parallel closing movement to the cage as it is rotated, and the flask-engaging clamping surfaces are accordingly at all times in parallel with the top and bottom surfaces of the flask. It follows that by means of this construction, the locking pressure on the flask is uniformly applied and is so maintained. This construction has the further advantage that the pressure is applied quickly and simultaneously at all points, since there is but one clamping element to turn, which element has a continuity of contact about the flask periphery.

An apparatus for the accomplishment of these objects is illustrated in the accompanying drawing in which Fig. 1 is an elevation partly in section;

Figure 1:
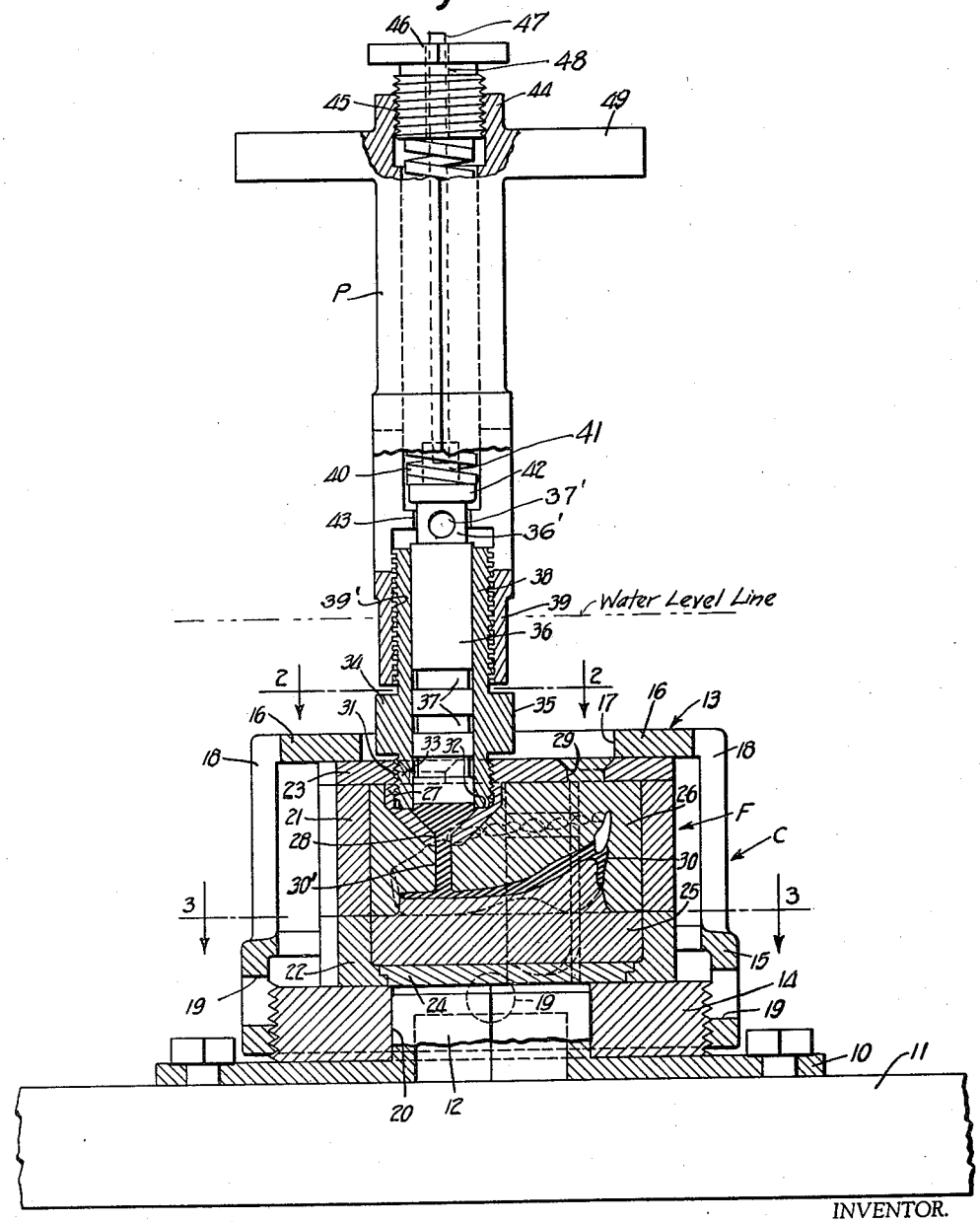
Figure 2:
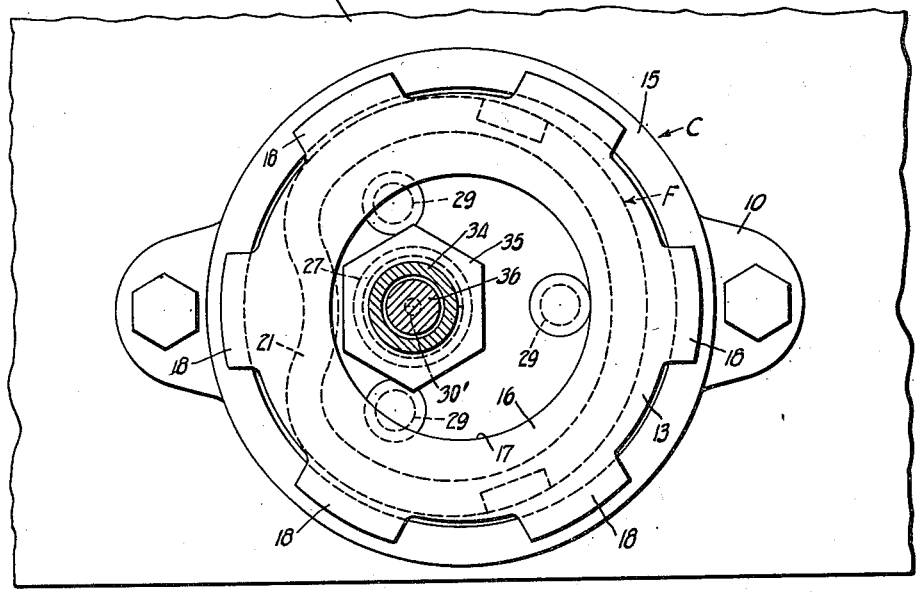
Fig. 2 is a cross section on the line 2—2 of Fig. 1.
Figure 3:
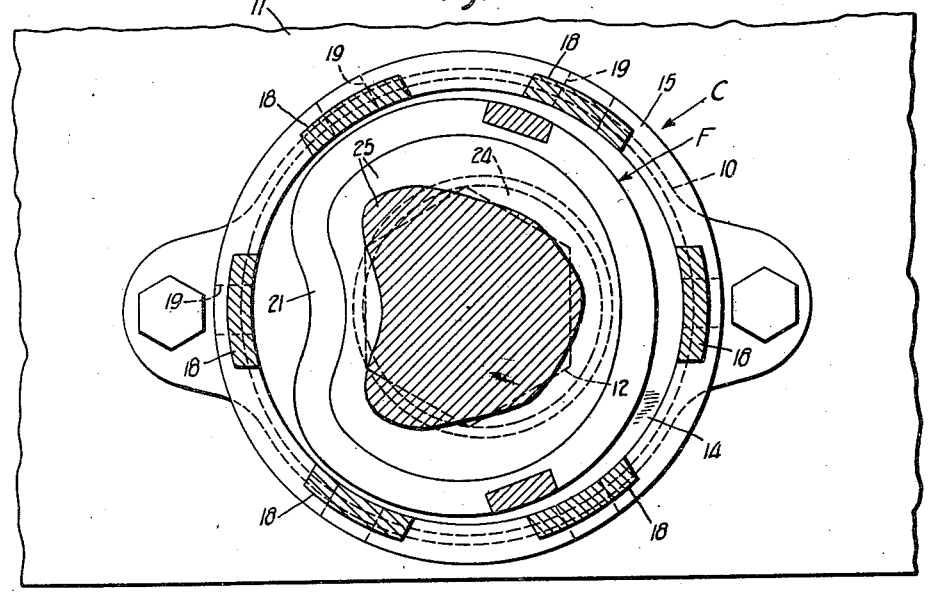
Fig. 3 is a cross section on the line 3—3 of Fig. 1.

The apparatus as shown comprises a base 10 which is bolted to a table top 11 or other suitable support. From the base 10 there projects upwardly a boss 12 of hexagonal or other suitable contour. The purpose of the base with its boss is to provide a convenient means for assembling and disassembling a clamping structure C which confines a denture mold flask F; the base otherwise is not a necessary element.

The clamping structure or cage C consists of the parts 13 and 14 between which the flask F is clamped. The member 13 is an inverted cup-shaped piece having its rim 15 provided with an internal screw thread to receive the exteriorly threaded edge of the flat-surfaced circular plate or cage ring 14. As shown the member 13 consists of a flat-surfaced annular ring 16 providing a central opening 17 and with legs 18 extending from the ring which legs are connected to the rim 15; holes 19 in the rim provide for the insertion of a wrench to screw the member 13 on or off the plate 14. The plate 14 has the appearance of a ring on account of a central hexagonal opening 20 to receive the boss 12.

Within the cage there is illustrated a denture mold flask F in cross-section comprising the flask parts 21 and 22 and the lid 23; the parting is along the section line 3—3. The lower half of the flask includes a removable disc or plate 24.

As mentioned above, the exterior top and bottom surfaces of the assembled flask parts are in planes parallel to the parting of the flask parts 21–22; and the contacting surfaces of the cage members are likewise in planes parallel to the parting.

Following the usual practice in making molds, the wax case is invested in the lower half 22 of the flask with plaster 25; the upper half or ring 21 of the flask is put in place, filled with plaster 26, and the lid 23 is applied. As a part of the lid there is a depending cone-shaped fitting 27 with an orifice 28; before the plaster 26 sets, a sprue hole 30' extending from the opening 28 to the wax cast and of a small diameter corresponding to the orifice is formed in the plaster by means of a pin pushed through the orifice 28 and the soft plaster to contact the pattern, and after setting of the plaster the pin is removed. When the lid is pressed on, excess plaster escapes through an opening 29 in the lid and the opening 29 is beveled so that the plaster locks the lid in place when set. After the plaster has hardened, the flash is boiled, the two parts of the flask are separated, and the wax is removed to leave a mold cavity 30 connected to the orifice 28 by the sprue hole 30'.

For molding a denture the cavity 30 (in the upper part of the flask) is packed, while the flask is hot, with material until the cavity is about one-half to three-fourths full. The lower half of the flask is then placed on the upper half, and the assembly inserted in the inverted cage C. The cage ring 14 is screwed on tightly to hold the flask parts in place, and the assembled cage and ring are turned upright and placed on the boss 12; further tightening of the cage is obtained with a wrench engaging the openings 19. In this operation, the under surface of the flat ring 16 of the cage is in parallelism with the upper surface of the lid 23 of the flask; moveover, there is a uniform application of pressure about the lid periphery. It follows that the flask halves are pressed together at all points of the parting (3—3) with the same pressure, and any relatively low pressure spots for extrusion of denture material is eliminated. At the same time there is but one member, the cage, to tighten.

The cone-shaped fitting 27 has an interior cylindrical surface provided with screw threads 31 and an annular seat 32 for receiving and seating a threaded end 33 of a tubular nozzle 34 provided at its intermediate portion with a thickened section 35 of hexagonal cross-section for engagement by a wrench; by this arrangement there is a metal-to-metal contact of the nozzle and fitting for accurately mounting the nozzle and at the same time the fitting relieves the plaster of much of the applied pressure. Within the nozzle 24, there reciprocates a piston 36 formed with annular grooves 37; the function of the piston is to force out a charge of material placed in the nozzle, and the grooves minimize any tendency to sticking through material clinging to the walls of the nozzle. The upper end 36' of the piston has a hole 37' so that the piston can be lifted by inserting a rod through the hole which becomes necessary when recharging the nozzle. The upper end 38 of the nozzle is threaded to receive an internally threaded end 39' of a barrel 39. Within the barrel 39 there is a compression spring 40 which presses against a movable plug 42 having its downward movement limited by an inwardly extending flange 43 on the barrel. At the upper end 44 of the barrel 39, internal threads 45 receive a threaded adjusting nut 46 which regulates the initial compression of the spring 40. Extending upwardly from the plug 42 is an indicator spindle 47 which slips in a passage 48 through the nut 46; the indicator is of such length that it is flush with the top of the nut when the plug 42 is seated on the flange 43. Cross handles 49 on the barrel provide for feeding the barrel along the nozzle and thus applying the spring pressure on the piston 36 in the nozzle. The assembly of the nozzle, the piston and the barrel with its parts constitutes an extrusion gun P for injecting material into the mold cavity.

It has been stated in the beginning that the compression spring must be one that when compressed does not develop a pressure causing compression of the plaster, i. e., gypsum, and yet during its extension maintains sufficient pressure to prevent bubble-formation and to compensate for shrinkage and at the same time force the hot viscous material into all parts of the mold. A spring found to satisfy these conditions was calibrated in a laboratory hydraulic press equipped with a pressure gauge reading in pounds; pressures were measured for every ⅛" of compression with the following results:

| Compression, Inches | Pressure, Pounds | Pressure, Pounds per sq. in. |
| --- | --- | --- |
| 0 | 0 | 0 |
| ⅛ | 35 | 115 |
| ¼ | 70 | 230 |
| ⅜ | 105 | 340 |
| ½ | 140 | 453 |
| ⅝ | 175 | 570 |
| ¾ | 210 | 685 |
| ⅞ | 240 | 780 |
| 1 | 270 | 880 |
| 1⅛ | 300 | 980 |
| 1¼ | 330 | 1,080 |
| Solid | 420 | 1,370 |

To use the gun, the nozzle is screwed in the lid 23 of the flask (assembled within the cage C) and filled with the denture material. The piston 36 is then placed on the charge in the nozzle and the gun barrel 39 is screwed on the nozzle. As the barrel advances along the nozzle, the plug 42 contacts the piston and the spring pressure is transmitted to the piston to force the charge into the fitting 27 and through the orifice 28 and the sprue hole 30'. At the same time the indicator 47 emerges at the top of the gun to show the spring compression and the consequent applied pressure. When the indicator shows the desired pressure, the assembly is immersed in boiling water so that the cage and the lower end of the nozzle is submerged. The material softens during heating and flows under the pressure into the mold, and in 3–5 minutes the gun barrel is again turned until a pressure is built up as shown by the indicator; it is found that the piston moves downward quickly. If there is no pressure (as shown by failure of the indicator to rise) when the gun barrel has been turned to its full extent, the nozzle is recharged by removing the barrel and then the piston by engaging the opening 37', and inserting another charge of material into the nozzle. With the building up of a definite pressure in the gun, the indicator remains up. A charge of the specific denture composition above described of vinyl copolymer and acrylate monomer required about eighty minutes immersion of the case in boiling water for a complete cure.

After curing or setting of the denture material the nozzle is turned with a wrench; because of the small diameter of the sprue, the turning of the nozzle breaks the sprue connected to the molded denture, and this should be done while the material is hot. Upon separation of the nozble from the flask the cage is placed in cold water to cool; the cage is thereupon loosened, the flask removed, and the plaster with the embedded denture is ejected from the flask by pressing on the plate 24. The lid 23 is separated from the plaster and the slug of denture material remaining in the fitting 27 is pushed out. The molded denture is freed from the surrounding plaster.

It is apparent from the foregoing description that the accomplishment of the object of molding accurately fitting dentures from compositions characterized by objectionable shrinkage in the molding involves a combination of features. It rests upon the injection under pressure of material into the mold to avoid overpacking as a compensation for shrinkage, but that in turn is only made possible, with the avoidance of fin-formation to disturb occlusion or thickening of the palate of the denture, by a locking pressure in unbroken continuity about the flask periphery. These various features then coact in contributing to the attainment of dentures of accurate dimension and undisturbed occlusion. Dentures molded from the compositions to which this invention lends itself have been found to be of exceptional strength and resistance to moisture and other conditions associated with their use.

This application is a continuation of Serial No. 481,249, filed March 31, 1943, now abandoned.

What is claimed is:

1. Molding apparatus for dentures comprising in combination a separable flask adapted to contain a denture mold, said flask having an opening to the exterior communicating with the mold cavity and top and bottom surfaces parallel with the parting surfaces of the flask, means for applying pressure continuously and uninterruptedly along the entire periphery of said top and bottom surfaces, and pressure extrusion means in communication with the opening.

2. Molding apparatus for dentures comprising in combination a separable flask adapted to contain a denture mold, said flask having an opening to the exterior communicating with the mold cavity and top and bottom surfaces parallel with the parting surfaces of the flask, a cage enclosing the flask comprising opposed thread-engaged members having parallel contacting surfaces positioned to contact the entire periphery of the top and bottom surfaces of the flask, and an extrusion gun detachably secured to the flask in communication with the opening.

CHARLES E. GALLEY.

REFERENCES CITED

The following references are of record in the file of this patent:

UNITED STATES PATENTS

| Number | Name | Date |
|---|---|---|
| 84,988 | Bellows | Dec. 15, 1868 |
| 545,341 | Brown | Aug. 27, 1895 |
| 1,606,705 | Joannides | Nov. 9, 1926 |
| 2,279,952 | Pryor | Apr. 14, 1942 |
| 2,319,479 | Ryder | May 18, 1943 |
| 2,329,239 | Banigan | Sept. 14, 1943 |
| 2,341,991 | Jackson | Feb. 15, 1944 |
| 2,345,917 | Coffman | Apr. 4, 1944 |
| 2,359,152 | Pryor et al. | Sept. 26, 1944 |
| 2,370,469 | Johnson et al. | Feb. 27, 1945 |

FOREIGN PATENTS

| Number | Country | Date |
|---|---|---|
| 374,472 | Great Britain | June 6, 1932 |
| 514,830 | Great Britain | Nov. 20, 1939 |